United States Patent
Kupreev et al.

(10) Patent No.: US 10,291,640 B2
(45) Date of Patent: May 14, 2019

(54) SYSTEM AND METHOD FOR DETECTING ANOMALOUS ELEMENTS OF WEB PAGES

(71) Applicant: AO Kaspersky Lab, Moscow (RU)

(72) Inventors: Oleg V. Kupreev, Moscow (RU);
Anton B. Galchenko, Moscow (RU);
Mikhail V. Ustinov, Moscow (RU);
Vitaly V. Kondratov, Moscow (RU);
Vladimir A. Kuskov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 220 days.

(21) Appl. No.: 15/437,828

(22) Filed: Feb. 21, 2017

(65) Prior Publication Data

US 2018/0069880 A1    Mar. 8, 2018

(30) Foreign Application Priority Data

Sep. 8, 2016 (RU) .................................. 2016136226

(51) Int. Cl.
*H04L 29/06* (2006.01)
*H04L 29/08* (2006.01)

(52) U.S. Cl.
CPC ...... *H04L 63/1425* (2013.01); *H04L 63/1408* (2013.01); *H04L 63/1416* (2013.01); *H04L 63/1441* (2013.01); *H04L 67/02* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,058,626 B1* | 6/2006 | Pan | G06F 17/30669 |
| 8,544,087 B1 | 9/2013 | Eskin et al. | |
| 9,923,916 B1* | 3/2018 | McClintock | H04L 63/1433 |
| 2008/0263663 A1* | 10/2008 | Ide | G06F 17/30705 |
| | | | 726/22 |
| 2011/0185421 A1 | 7/2011 | Wittenstein et al. | |
| 2014/0165198 A1* | 6/2014 | Altman | H04L 63/145 |
| | | | 726/23 |
| 2014/0283067 A1 | 9/2014 | Call et al. | |
| 2016/0352772 A1* | 12/2016 | O'Connor | H04L 63/1483 |

FOREIGN PATENT DOCUMENTS

| | | |
|---|---|---|
| EP | 2199940 A2 | 6/2010 |
| WO | 2012/154657 A2 | 11/2012 |

* cited by examiner

*Primary Examiner* — Benjamin E Lanier
(74) *Attorney, Agent, or Firm* — Arent Fox LLP; Michael Fainberg

(57) ABSTRACT

Disclosed are system and method for detecting anomalous elements of web pages. One exemplary method comprises: obtaining access to a web site, by a client computing device, by requesting a web page associated with the web site via a web server; executing the web page by the client computing device to gather data relating to the web page; determining at least one N-dimensional vector based at least on the gathered data; creating at least one cluster comprising a set of values of coordinates of vectors for at least one element of the web page in N-dimensional space based on the at least one N-dimensional vector; creating a statistical model of the web page based on the at least one cluster; and using the statistical model for detecting anomalous elements of the web page.

20 Claims, 5 Drawing Sheets

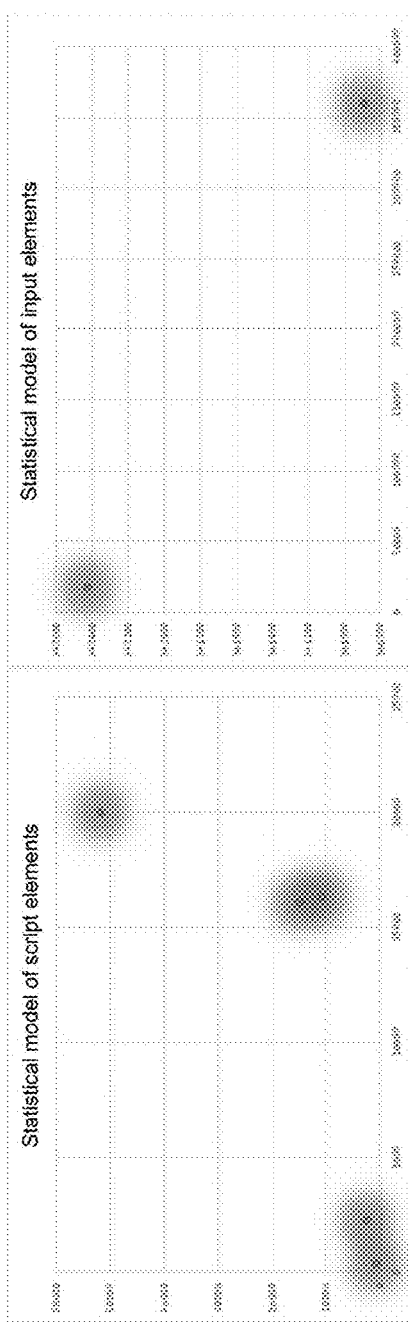
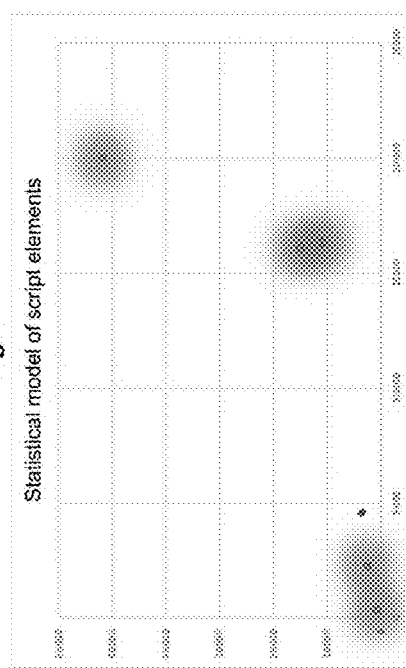

SYSTEM AND METHOD FOR DETECTING ANOMALOUS ELEMENTS OF WEB PAGES

CROSS-REFERENCE TO RELATED APPLICATIONS

This application claims benefit of priority under 35 U.S.C. 119(a)-(d) to a Russian Patent Application No. 2016136226 filed Sep. 8, 2016, which is incorporated by reference herein.

FIELD OF TECHNOLOGY

The present disclosure relates generally to the field of cybersecurity, and more specifically to systems and methods of detecting anomalous elements of web pages.

BACKGROUND

In recent times banks and other financial organizations have been actively adopting web banking services (Internet banking) as part of the banking services. Web banking is the general term for technologies of remote banking services, as well as access to accounts and operations (with them) available at any time and from any computer having access to the Internet. To perform these operations, a web client (such as a browser) is typically used.

The widespread use of such technologies naturally attracts hackers, who are interested in stealing funds from the accounts of the users of the remote service systems. One of the popular attacks on the users of web banking is an attack during which malicious software is put in place of the contents of the web page being displayed to the user. The malicious software embeds a HTML code in the web page. This attack is often called a "man in the browser" or "web code injection" attack. The attack may start with the use of a Trojan application, for example, which installs a malicious extension in the victim's browser, which is launched when the browser is restarted. There then occurs an intercepting of the user's traffic being routed to a particular web site (most often a banking site). The web page being displayed to the user is then altered (during its loading or opening), making it possible to modify the external appearance of a particular element of the web page, steal the victim's authentication data being entered, or redirect funds being transferred by the user to a third-party account.

Solutions existing at present appear to be aimed at increasing the secure working of a user in a network with regard to attacks which introduce outside code into a web page. However, these solutions do not effectively determine whether a web page has been altered by malicious software, and identify anomalous elements in the web page version at the user's end without installing additional software. At the same time, the additional software such as various security clients, thin clients (light agents), and other antivirus means are not always able to be installed at the user's end, which ultimately results in errors in the operation of the antivirus application. Thus, for example, an error of a first kind may involve letting through an attack of the "man in the browser" type to the computing system (computer) in order to seize the data transfer channel and obtain access to all information being transferred, and an error of a second kind may involve the erroneous determination of a legitimate web page alteration at the user's end as being anomalous.

SUMMARY

Disclosed are systems and methods of detecting anomalous elements of a web page.

In one exemplary aspect, computer-implemented method for detecting anomalous elements of a web page comprises: obtaining access to a web site, by a client computing device, by requesting a web page associated with the web site via a web server; executing the web page by the client computing device to gather data relating to the web page; determining at least one N-dimensional vector based at least on the gathered data; creating at least one cluster comprising a set of values of coordinates of vectors for at least one element of the web page in N-dimensional space based on the at least one N-dimensional vector; creating a statistical model of the web page based on the at least one cluster; and using the statistical model for detecting anomalous elements of the web page.

In one exemplary aspect, the method further comprises: storing the at least one N-dimensional vector; and obtaining and executing the web page, by another client computing device, to gather additional data relating to the web page in connection with the at least one N-dimensional vector prior to creating the at least one cluster.

In one exemplary aspect, the web server is configured to add at least one script to the web page in response to receiving a request from the client computing device requesting the web page.

In one exemplary aspect, the method further comprises: executing the web page by the client computing device comprises executing the at least one script to gather the data relating to the at least one element of the web page.

In one exemplary aspect, the method further comprises: comparing the at least one N-dimensional vector with clusters and a N-dimensional vector of at least one previously constructed statistical model of the web page; and determining and identifying the at least one element of the web page as being anomalous upon detecting at least one of: a distance between the at least one N-dimensional vector of the at least one element of the web page and centers of clusters of statistical models of the web page, in the N-dimensional space, is greater than a radii of the clusters; or a measure of proximity between the at least one N-dimensional vector of the at least one element of the web page and the centers of clusters of the statistical models of the web page, in the N-dimensional space, is greater than a first selected threshold value; or a measure of proximity between the at least one N-dimensional vector of the at least one element and N-dimensional vectors of the clusters of the statistical models of the web page which are most distant from the centers of the clusters, in the N-dimensional space, is greater than a second selected threshold value.

In one exemplary aspect, the method further comprises: adding the at least one N-dimensional vector of the at least one element of the web page to the statistical model of the web page upon detecting that the at least one element is not anomalous.

In one exemplary aspect, the web server is configured to: disable a connection with the client computing device in response to detecting that the at least one element of the web page is anomalous; perform an antivirus scan of the at least one element of the web page to at least determine a statistical significance of the at least one element in connection with a threshold value; and in response to detecting that the statistical significance of the at least one element is greater than the threshold value, identify the at least one element as being safe and re-establish the connection with the client computing device.

In one exemplary aspect, in response to detecting that the at least one N-dimensional vector of the at least one element of the web page does not correspond to the statistical models of the web page, determining a ratio of the number of web pages relating to the at least one element to a total number of web pages used in the statistical model of the web page.

In one exemplary aspect, the method further comprises: the number of web pages relating to the at least one element comprises the number of web pages containing the at least one element or nearby elements whose distances between their N-dimensional vectors in the N-dimensional space is less than a selected threshold value.

In one exemplary aspect, a system for detecting anomalous elements of web pages comprises: at least one processor of a client computing device configured to: obtain access to a web site by requesting a web page associated with the web site via a web server; execute the web page to gather data relating to the web page; determine at least one N-dimensional vector based at least on the gathered data; create at least one cluster comprising a set of values of coordinates of vectors for at least one element of the web page in N-dimensional space based on the at least one N-dimensional vector; create a statistical model of the web page based on the at least one cluster; and use the statistical model for detecting anomalous elements of the web page.

In one exemplary aspect, a non-transitory computer readable medium storing thereon computer executable instructions for detecting anomalous elements of web pages, includes instructions for: obtaining access to a web site, by a client computing device, by requesting a web page associated with the web site via a web server; executing the web page by the client computing device to gather data relating to the web page; determining at least one N-dimensional vector based at least on the gathered data; creating at least one cluster comprising a set of values of coordinates of vectors for at least one element of the web page in N-dimensional space based on the at least one N-dimensional vector; creating a statistical model of the web page based on the at least one cluster; and using the statistical model for detecting anomalous elements of the web page.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 4a, 4b, 4c show examples of visualizations of statistical models, according to aspects of the present invention.

DETAILED DESCRIPTION

Example aspects on the invention are described herein in the context of a system, method and computer program product for detecting anomalous elements of web pages. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspects of the invention:

A web page may include data (code) created by a web server for processing by a web client (browser) and organized with the use of hypertext markup languages (HTML, XHTML, XML, WML, VML, PGML, SVG, XBRL and others) and script languages (JScript, JavaScript, ActionScript, Tcl, Lua, Perl, PHP, Python, REBOL, Ruby and others).

Content here may refer to the content of the web page.

A script may include a procedure being executed, written in a script language, which may be launched for execution at a server's or client's end by a request arriving upon display of a strictly determined web page.

An inline script may include a script whose executable code (body) is part of the content of the web page. For example, the inline script may be disposed between tags <script> </script>.

A tag (marker) may include a special construction of hypertext markup language. It may constitute text enclosed in angled brackets <name_tag>. Each tag may bring a particular command to a browser on how to display the tag and the subsequent content. Tags in a particular case may have attributes which clarify the tag, expand the possibilities of the tag and allow for a more flexible control, for example of the content of the container tag. For example, <script src="URL"> . . . </script>. The attribute src may indicate the location of the body of the script.

A container tag may include a paired tag having opening and closing tags. It may contain both text and other elements of hypertext language.

An element of a web page (an element of markup language) may include a combination of a starting tag, an end tag (in certain cases the starting and the end tags coincide, for example in the case of the tag <br>), and the content between the tags. The totality of elements of the web page form the content of the web page. At least the following kinds of elements may exist, being distinguished by the names of the corresponding tags: hyperlinks, text blocks, text formatting, lists, objects (e.g., media files, applets, scripts, native code and others), images, image maps, tables, forms, characters, and others.

Figure 2:
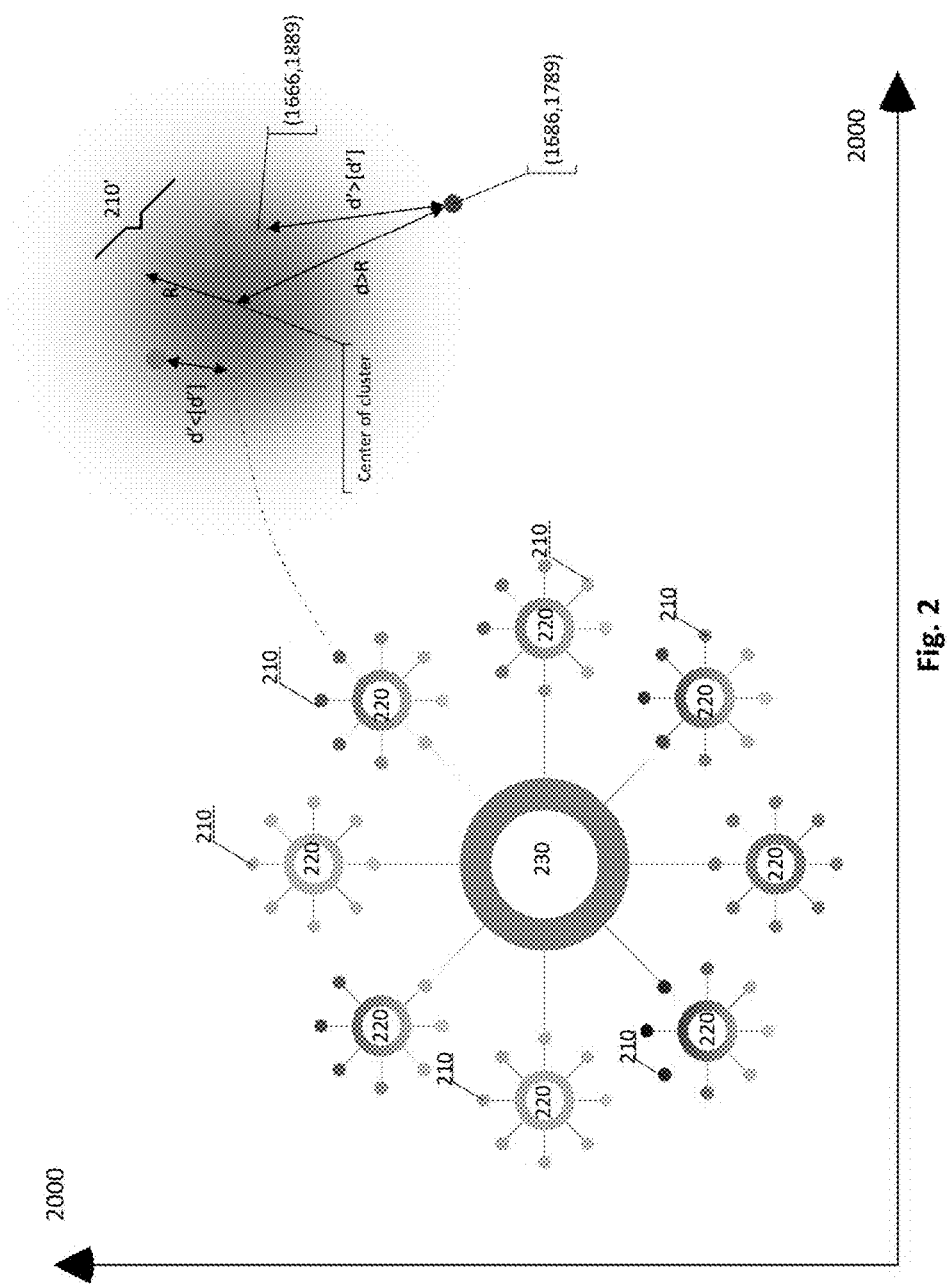
FIG. 2 shows an example of an N-dimensional space with statistical models and metrics of a cluster, according to aspects of the present invention.

An N-dimensional vector of an element may include an ordered set of n real numbers, where the numbers may include the coordinates of a vector. The number of coordinates of the vector is known as the dimensionality of the vector. The coordinates may determine the position of the corresponding element (such as a script) or group of elements of the same kind (such as the elements of forms) of a web page in N-dimensional space (FIG. 2 shows an example of two-dimensional space). The vector may be obtained by transformation of information about the content of the element or group of elements. The vector may reflect certain information about the content of the element or group of elements. In one example, each coordinate may reflect one of the characteristics of the content of the element, for example, one coordinate may characterize the number of operators in the script, another the number of eval operators. The numbers may also reflect the lexicographical order of the string parameters of the content of the elements or the Levenshtein distance between string parameters of different elements. For example, FIG. 2 shows examples of vectors, in particular two-dimensional vectors with coordinates (1666, 1889) and (1686,1789).

A cluster may include a set of allowable values of the coordinates of vectors for a strictly defined element or group of elements in N-dimensional space. According to one exemplary aspect, a selected element or group of elements may be assigned to a certain cluster if a distance from the N-dimensional vector of the element to the center of that cluster is less than the radius of the cluster in the direction of the N-dimensional vector. FIG. 2 shows an example of the cluster 210'. In an example, an element may be assigned to a certain cluster if the value of a distance (in FIG. 2, "d'") from the N-dimensional vector of the element to the nearest N-dimensional vector of an element of the given cluster is less than the maximum allowable (threshold value of the distance [d']) or if the value of the distance (in FIG. 2 "d") from the N-dimensional vector of the element to the center of that cluster is less than the radius of this cluster. For example, the distance from the vector (1666, 1889) to the center of the cluster is less than the radius of the cluster, and consequently the element or group of elements whose content may be reflected by the vector belongs to the given cluster. On the other hand, the distance from the vector (1686, 1789) to the center of the cluster is greater than the radius of the cluster and the distance to the nearest N-dimensional vector is greater than a threshold value, and therefore the element or group of elements whose content may be reflected by the vector does not belong to that cluster. Variants of distances for evaluating proximity may include, but not limit to the following: linear distance, Euclidean distance, the square of Euclidean distance, generalized Minkowski exponential distance, Chebyshev distance, Manhattan distance and others.

The measure of proximity (degree of similarity, coefficient of similarity) may include a nondimensional parameter for determining the similarity of elements of a web page. Measures used for determining the measure of proximity may include, but not limit to the following: Ochaiai, Jaccard, Sokal-Sneath, Kulczynski, symmetrical Dice coefficient and others.

The center of a cluster (centroid) may be the mean geometrical locus of the N-dimensional vectors in N-dimensional space. For clusters consisting of one vector, the given vector may be the center of the cluster.

The radius of the cluster (in FIG. 2 "R") is the maximum distance of the N-dimensional vectors occurring in the cluster from the center of the cluster.

Various known algorithms and approaches may be used for clustering, including hierarchical (agglomerative and divisive) and non-hierarchical.

A statistical model of the elements of a web page (model of the elements of a web page) may include a set of clusters 210 for the elements of one kind or groups of elements of one kind. For example, the statistical model of scripts of a web page, the statistical model of the forms of a web page. In FIG. 2, the statistical models of the elements of a web page may be designated as 220. For models consisting of one cluster, that cluster may be the model of the elements.

A statistical model of a web page (model of a web page) may include a set of clusters of elements of the web page of all kinds and/or groups of elements (including groups of elements containing elements of different kinds). For example, the statistical model of the authorization page. In other words, the statistical model of a web page 230 may include a set of models of the elements of the web page 220. By analogy, the statistical model of a web site may include a set of clusters of elements of the web page of all kinds and/or groups of elements of all web pages of the web site. That is, the statistical model of a web site (not shown in the figures) may include a set of models of the web pages 230.

An anomalous element of a web page may include an element of the web page whose vector is not assigned to any one of the clusters of the statistical model constructed for the elements of the given type, or it has a statistical significance below the threshold.

The statistical significance of an element may be the value of the ratio of the number of times the element being evaluated is encountered in the content of the web pages to the total number of web pages obtained for the construction of the model or to the number of web pages obtained for the construction of the model on a certain section (the evaluation section), where the length of the section may be determined by the number of web pages obtained for the construction of the model as of a particular time, such as the time of commencement of observation of the element. For example, if 100 pages have been obtained and the element being evaluated has been encountered 30 times, the statistical significance is 30%.

The statistical significance of a cluster may be the value of the ratio of the number of elements whose vectors form the cluster being evaluated in the content of the web page to the total number of web pages obtained for the construction of the model or to the number of web pages obtained for the construction of the model on a certain section, where the length of the section may be determined by the number of web pages obtained for the construction of the model as of a particular time, such as the time of commencement of observation of the cluster.

The threshold value of statistical significance may be the value of the statistical significance of an element or cluster beyond which the element or cluster (and the elements of the cluster) are considered to be statistically significant, in the event that if the value of the statistical significance of an element of a cluster is below the established threshold value, the element or cluster is considered to be anomalous.

To create the clusters, hierarchical methods may be used, for example, the cluster may be created by an agglomerative method, in which the nearest (in distance) N-dimensional vectors of the elements may be isolated into clusters or the nearest (in distance) clusters may be combined into one cluster. When using this method, linear or Euclidean distance or generalized exponential distance of Minkowski, Chebyshev or Manhattan may be used. Further, the vectors may be considered to be nearest which have the least mutual distance, and a cluster may be isolated until such time as the radius of the cluster comes as close as possible to a threshold value of the radius, where the closest possible radius may be the one which will exceed the threshold value of the radius in the next round of isolating the cluster. In another case, a cluster may be isolated until such time as no clusters or vectors with a permissible measure of proximity remain, where the permissible measure of proximity may be a measure not exceeding the established threshold value. Clusters are closest which have the least distance between the centers.

Alternatively, clusters may be created by a divisive method, where a cluster may be formed by vectors whose mutual distance is less than a maximum permissible distance, the maximum permissiveness of the distance being determined by a threshold value, and the clusters may be separated until such time as the radius of the cluster becomes equal to or less than the threshold value of the radius, for example.

Figure 1:
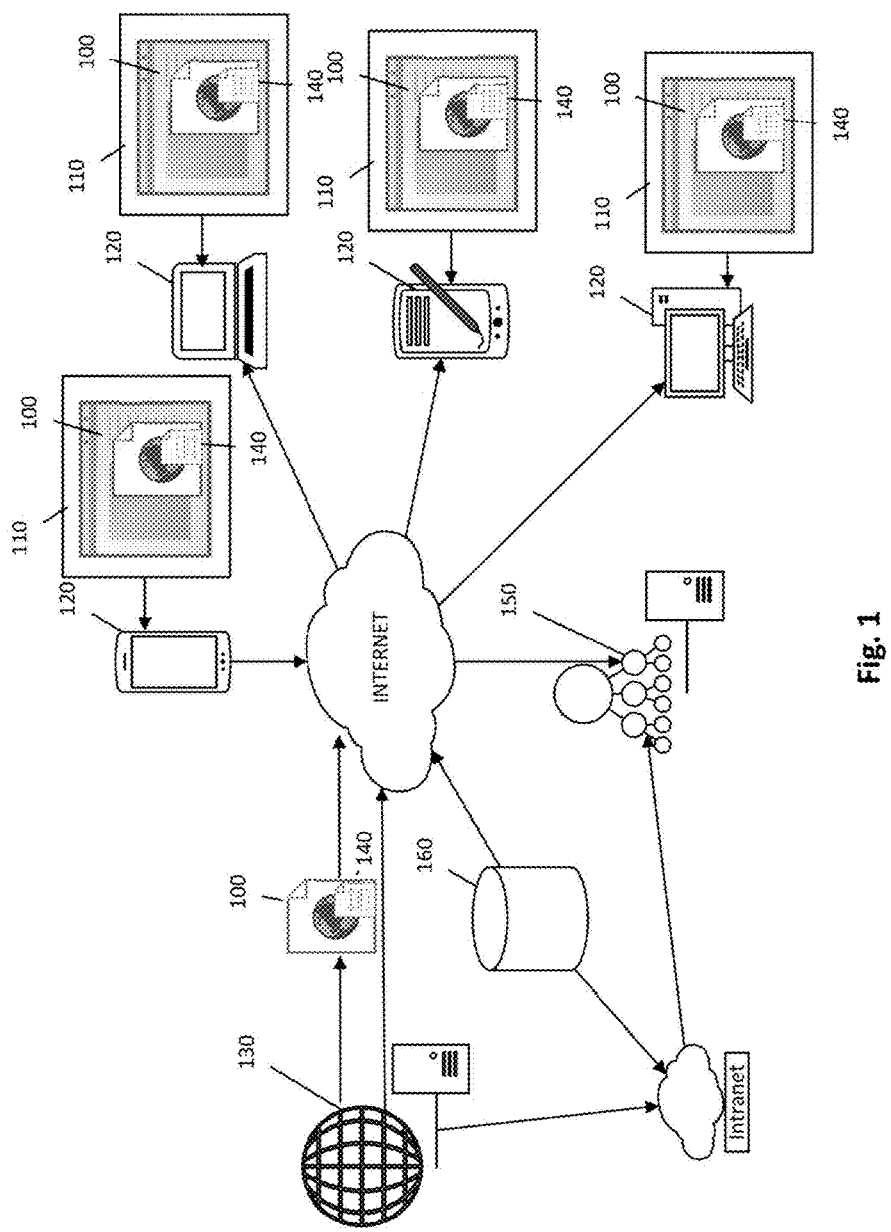
FIG. 1 shows an exemplary system for detecting anomalous elements of web pages, according to aspects of the present invention.

FIG. 1 shows an exemplary system for detecting anomalous elements of web pages, according to aspects of the present invention. The system may include, but not limited to the following devices: a user's device 120, with a web client 110 installed thereon; a web server 130; a control server 150, and a database 160, all of which are connected via a network.

In one exemplary aspect, a web client 110, such as a Web browser, may be installed on the user's device 120. The web client 110 may be configured to request, process, manipulate and display the content of web sites, where a web site may include a set of logically interrelated web pages 100. The web client 110 may dispatch requests to obtain resources, designated, for example, by uniform resource locator (URL) addresses to the web server 130 and receive replies, generally along with a web page 100 or an element of a web page from the web server 130. The web server 130 on request from the web client 110 may send out a ready web page 100 or form a page dynamically, in the invention being described by the web server 130 for each web page 100 being sent to the client, and in addition to the usual content there is added a script 140. The function of the script 140 may include gathering at least at the web client's end 110 the data of a web page 100 (information about the elements or a group of elements of the web page, information about an element, in a particular case the content of an element) which contains the given script 140. In one example, the information about the element of the web page 100 may include the content of the given element. The elements of a web page 100 and the content of these elements of the web page 100 at the web client's end 110 may differ from the elements and the content of these elements of the same version of the web page 100 at the web server's end 130, by reason of the dynamic refreshing of the web page at the web client's end 110 or as a result of a "man in the browser" attack.

In one exemplary aspect, the control server 150 may receive the information gathered by the script as to the elements or group of elements of the web page. The script may dispatch the gathered data either in a "raw" or transformed state, the format of the data being dispatched may be determined by the functionality of the script 140 which has been added by the web server 130 to the web page 100, namely: the script in the process of execution dispatches strictly defined information on the elements of the web page 100 in a strictly specified form, dictated by the functionality of the script; or the script dispatches data to the web server 130 or to the control server as to its successful launching at the client's end 110 and receives in response a command as to which elements of the web page 100 need to be gathered and in what form and to dispatch the information to a recipient (the web server 130 or directly to the control server 150).

The primary methods of transformation of data may include, but not limit to the following: quantization, sorting, merging (pasting), grouping, data set configuring, inserting of values in tables, computed values, data coding, normalization (scaling).

In one example, as a result of the transformation of the data, the data may acquire the attributes of information.

One of the methods of transformation of scripts may include the construction of an abstract syntactical tree and transmission to the recipient (the web server 130 or directly to the control server 150) of only the significant operators and constructions predetermined by the settings of the script 140 or by commands from the recipient.

In one exemplary aspect, all the data gathered by the script 140 may be transferred to the control server 150. The control server 150 may be configured to obtain the data directly from the web clients 110, or through the web server 130. In a particular case, the control server 150 may be present in the same network as the web server 130. The data gathered by the control server 150 may be used to construct the statistical model of the web page 230 and to detect anomalous elements of the web pages. A number of modules (not shown) may be implemented on the control server 150. A processing module of the control server 150 transforms the data gathered by the scripts 140 into N-dimensional vectors, and stores them in the database 160. An analysis module of the control server 150 forms clusters 210 from the received vectors and to detect anomalous elements or groups of elements whose content may be reflected by the received vectors, this function being implemented by a mutual comparison of the N-dimensional vectors and the formed clusters 210 in N-dimensional space.

The database 160 may be configured to store the constructed models and vectors.

Figure 3:
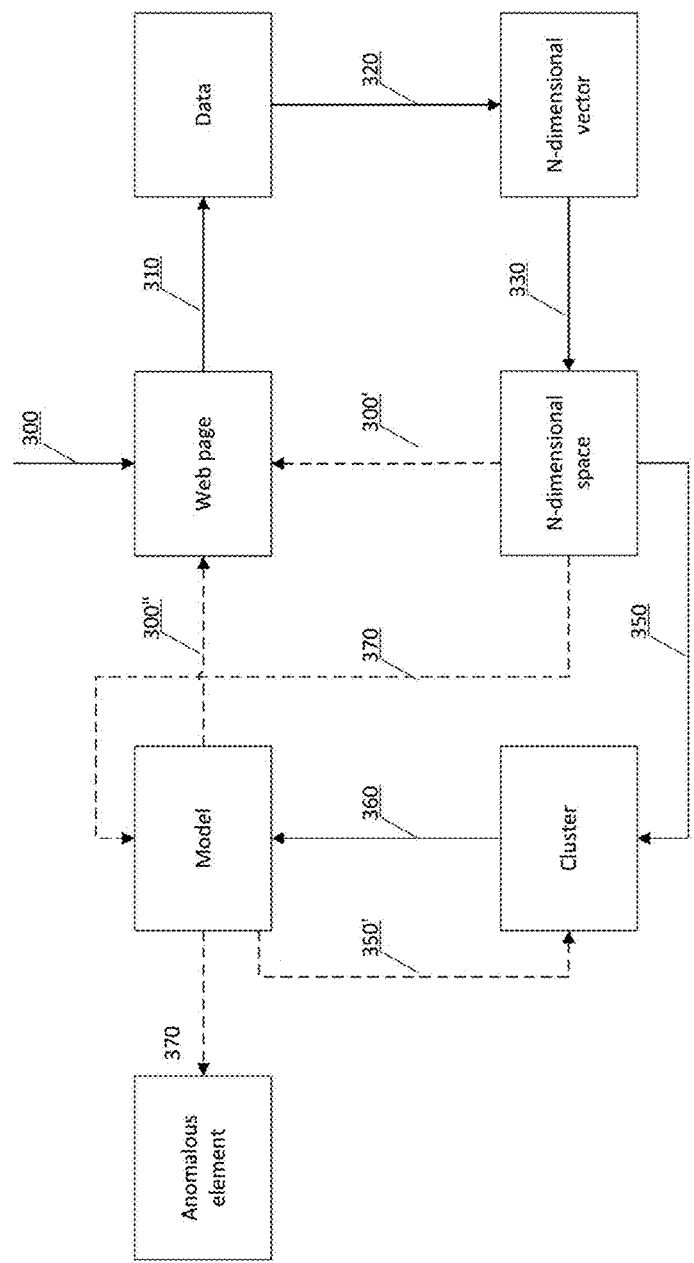
FIG. 3 shows exemplary methods for detecting anomalous elements of web pages, according to aspects of the present invention.

The system disclosed herein may carry out several methods, including but not limited to: the method of construction of a statistical model of a web page 230 and the method of detecting anomalous elements of a web page 100 with the aid of the constructed model of the web page 230, which are illustrated in FIG. 3.

In one exemplary aspect, the method of construction of a statistical model of the web page 230 may be implemented as follows. In step 300, a user may obtain access to a web site from his device, where the web client 110 by a request sent to the web server 130 may be configured to obtain from the web server 130 the web page 100 of the site, during which process the web server 130 may be configured to add a script 140 to the web page 100. In step 310, the script may be executed at the web client's end 110, gathering data contained in the web page 100. The data gathered by the script 140 may contain various information, in particular the script 140 may gather the content of at least one element of the web page (script, form, etc.). The data gathered by the script 140 may be configured to be transformed if necessary, the data being transformed either by the script 140 itself or by the processing means on the control server 150. In step 320, the gathered data may be configured to be transformed into at least one N-dimensional vector, which may be saved in step 330. From at least one vector, in step 350, there may be created at least one cluster 210. On the basis of at least one created cluster 210, in step 360, a statistical model of the web page 230 may be created.

In one example, after the saving of the obtained N-dimensional vector, in step 300', the web page 100 may be obtained by another web client 110 and on the basis of the data gathered from this web page, N-dimensional vectors may be additionally obtained in step 320 and only after this are the clusters created.

In another example, after creating the clusters 210 and constructing the model 230, in step 300", the web page 100 may be obtained by another web client 110 and on the basis of the data gathered by the script 140 from this web page N-dimensional vectors are obtained, and on the basis of the obtained N-dimensional vectors the previously created clusters 210 may be corrected (refreshed) (their radius, center/centroid are changed), or new clusters 210 may be created, thereby refining (with the corrected clusters 210) and supplementing (with the newly created clusters 210) the statistical model of the web page 230. The data gathered by the script 140 may differ from the data gathered by the script 140 in the previous iteration, for example, information about other elements of the web page 100 may be gathered.

In one exemplary aspect, the method for detecting anomalous elements on the basis of a statistical model of a web page 230 may be implemented as follows: In step 300, the user may obtain access to a web site from his device, where the web client 110 by a request sent to the web server 130 may be configured to obtain from the web server 130 the web page 100 of the site, during which process the web server 130 may be configured to add a script 140 to the web page 100. In step 310, the script may be executed at the web client's end, gathering data contained in the web page 100. The data gathered by the script 140 may contain various information, in particular the script may gather the content of at least one element of the web page (script, form, etc.). The data gathered by the script 140 may be configured to be transformed if necessary, the data being transformed either by the script 140 itself or by the processing means of the control server 150. In step 320, the gathered data may be configured to be transformed into at least one N-dimensional vector, which may be saved in step 330. The obtained vector in step 370 may be compared (by determining the mutual distance, for example, between the obtained vector and the center of the cluster) with the clusters of the constructed statistical model of the web page 230 and/or the N-dimensional vectors of the given model 230. In step 370, as a result of the comparison, the element being analyzed may be identified as being anomalous when, for example: (i) the distance between the N-dimensional vector of the element and the centers of all clusters of the model, in N-dimensional space, is greater than the radii of these clusters; or (ii) the measure of proximity between the N-dimensional vector of the element and the centers of all the clusters of the model, in N-dimensional space, is greater than a threshold value; or (iii) the measure of proximity between the N-dimensional vector of the element and the N-dimensional vectors of the clusters of the model which are most distant from the center of the clusters, in N-dimensional space, is greater than a threshold value.

In one example, if the element is not recognized as being anomalous, then in step 350', the N-dimensional vector of the given element may be added to the statistical model of the web page 230.

In another example, upon detecting an anomalous element of the web page 100, the web server 130 may be configured to disable the connection with the web client 110 and the user's device 120 or the connection may be preserved, but the web server 130 may cease responding to requests of the client 110 (the data transmission via the connection is halted). At the moment of halting the data transmission, the detected anomalous element of the web page may be scanned by the antivirus means (not shown) of the control server 150 for the presence of a malicious functionality (danger) or an observation may be carried out on that element. If a cluster is formed around it with a statistical significance above a threshold, the detected anomalous element may be identified as being safe, such that the connection is re-established, and the session continues.

In a particular case, when the model is constructed on the basis of web pages not knowing in advance whether or not they contain anomalous elements, a collision may be possible: the N-dimensional vector of the element does not turn up in any of the clusters of the model and a dilemma arises—whether to create a new cluster on the basis of the given vector or to identify the element whose content is reflected by the given vector as being anomalous. The collision may be resolved on the basis of an evaluation of the statistical significance of the element or the cluster, which may be created on the basis of elements similar (close) to the one being evaluated on the evaluation section. Namely, on the basis of the ratio of the number of web pages containing the element being evaluated (or nearby elements, elements whose distance between their N-dimensional vectors in N-dimensional space is less than a certain threshold value) to the total number of web pages being used in the construction of the model on the section being evaluated, where the length of the section is measured as the number of pages or iterations. If the value of the statistical significance of the evaluated element of the web page on the evaluation section is close (the proximity being determined by a threshold value) to the value of statistical significance of the other elements (or the mean value of the statistical significance of the other elements) on the given section or surpasses a certain threshold value, such as by 20%, then the element is recognized as being statistically significant, or else (if it does not surpass it) as being anomalous. For example, in the model construction step a certain element of the web page 100 may appear, whose vector may not turn up in any of the previously created clusters 210. It is thus necessary to determine whether the given element is anomalous by, for example, determining its statistical significance on a section, where the length of the section comprises 200 web pages 100. In one example, the threshold value of statistical significance for the given type of element may be equal to 20%. This verification shows that, on the given length of element, elements close to the evaluated one have been encountered 4 times, which may correspond to a value of statistical significance of 2%, which is lower than the threshold value, so that the element being evaluated and those close to it (the cluster formed around the evaluated element) may be anomalous. The threshold value of statistical significance, in a particular case, may be determined as the minimum value of statistical significance of the cluster for an element of the same kind. For example, the model contains clusters of scripts with statistical significance values of 25%, 32%, 47% and 95%, and therefore the threshold value for the given kind of element may be set at 25%.

In one exemplary aspect, the statistical significance may also be used in the detection of anomalous elements of web pages. For example, this is used when the statistical model has not been constructed, or the above-described dilemma is being resolved. In the first step, web pages 100 may be obtained from the web server 130 by the web client 110 and implemented on the user devices 120, the web pages 100 containing a script 140 which when executed gathers information about the content of at least one element of the web page 100 at the web client's end 110 and dispatches the gathered information from the user device 120. The aforementioned script may be executed with the help of the web client 110 to gather information on the content of at least one element of the web page 100 at the web client's end 110 and dispatch the gathered information from the user devices 120 whose web clients 110 have received the web page 100. At the control server's end 150 the information on the content received from the devices 120 may be configured to be transformed into N-dimensional vectors of the elements, and the obtained N-dimensional vectors may be clustered by any suitable method. The N-dimensional vectors may be formed for each element of the web page, for a group of elements, for a group of elements of the same kind, or elements of different kinds may make up the group. After the clusters 210 have been formed, where a cluster 210 may include at least one vector, the statistical significance of the obtained clusters 210 may be determined, where the statistical significance may be determined as the ratio of the number of N-dimensional vectors in the cluster 210 to the number of web pages 100 from which information on the content of their elements was gathered and dispatched to the control server 150 or the web server 130. As a result, elements whose N-dimensional vectors form a cluster with statistical significance less than a threshold may be determined and identified as being anomalous elements. The threshold significance may be assigned by the methods described above, and it may also depend on the kinds of elements, the methods of clustering, the length of the evaluation section, and so on.

In one exemplary aspect, when a user requests a web page of a web banking site, e.g., https://my.KasperskyBank.ru/, -continued

```
<script async="" src="/kfs/kfs"></script>
<script>!function( ){var e=document.getElementById("before-
init_noscript");e&&(e.className="ui-browser_holder-block-hide");var
o=function( ){try{return"withCredentials"in new
XMLHttpRequest}catch(e){return!1}}( );if(o){var
t=function( ){if(navigator.cookieEnabled)return!0;document.cookie=
"cookietest=1";var
e=-1!=document.cookie.indexOf("cookietest=");return document.cookie
="cookietest=1;
expires=Thu, 01-Jan-1970 00:00:01
GMT",e}( );if(t)document.body.removeChild(document.getElementById
("before-init"));else{var n=document.getElementById("before-
init_nocookies");n&&(n.className="ui-browser_holder-block")}}else{var
r=document.getElementById("before-init_old-browser");r&&(r.className=
"ui-browser_holder-block")}}( );</script>
```

For the <script> elements having the attribute src, a loading and normalization of the body of the script may be performed; for inline scripts, only a normalization. For example, for the above-indicated inline scripts, the normalized form may be as follows (only the significant language constructions and standard objects/methods have been kept, the literals have been "depersonalized"):

```
document.documentElement.i0=v0;vari1=window.i1 || { };i1.i2=v1,i1.i3=v2,i1.i4=v3,i1.i5=
v4,i1.i6={i7:v5,i8:v6},i1.i9=v7;
!function( ){vari0=document.getElementById(v0);i0&&(i0.i1=v1);vari2=function( ){try{ret
urnv2innewXMLHttpRequest}catch(i0)}return!v3}}( );if(i2){vari3=function( ){if(navigator.i
4)return!v4;document.cookie=v5;vari0=-
v3!=document.cookie.indexOf(v6);returndocument.cookie=v7,i0}( );if(i3)document.body
.removeChild(document.getElementById(v8));else{vari5=document.getElementById(v9);
i5&&(i5.i1=v10)}}else{vari6=document.getElementById(v11);i6&&(i6.i1=v10)}}( );
``` the requested web page may be added a script 140, and the page 100 may be dispatched to the web client 110 implemented on the user device 120. The script 140 at the user's end may gather the <script> elements present on the web page:

```
<script>document.documentElement.id="js";var ..../Kasperskybank/";
</script>
<script src="//static.kaspersky.ru/dist/kfs/kfs.js" crossorigin=
"anonymous"></script>
<script src="https:// static.kaspersky.ru
/ib/prod/2842c77095d860e412d7a8c1302311d53c891b4e/ Kasperskybank /
Kasperskybank.js" crossorigin="anonymous"></script>
```

Next, the script 140 may gather the <input> elements present on the page:

```
<input autocomplete="off" autocorrect="off" autocapitalize="off"
class="m-login_form-field-input ng-pristine ng-invalid
ng-invalid-required ng-touched"
type="text" ... ng-blur="login.focus = false" placeholder="password">
```

The script 140 may transform the gathered data of the <input> elements, performing a normalization, for example, as follows (the attributes are sorted alphabetically, the tag name is cut off, gaps in the values of the attributes are cut out, the attributes are listed by ";"):

```
<autocapitalize=off;autocomplete=off;autocorrect=off;class=m-login_form-field-
inputng-pristineng-invalidng-invalid-requiredng-touched;name=lg;ng-
blur=login.focus=false;warmUp( );;ng-change=input(true);ng-disabled=false;ng-
keydown=login.focus=true&&$event.keyCode===13&&authUser( );ng-
keyup=fix(login.form.lg,$event);ng-
model=login.lg;placeholder=login;spellcheck=false;style=padding:0px;;type=text;ui-
focus=login.setFocus;validator=validator.lg>
<autocapitalize=off;autocomplete=off;autocorrect=off;class=m-login_form-field-
inputng-pristineng-untouchedng-invalidng-invalid-required;name=pw;ng-
blur=login.focus=false;ng-change=input( );ng-disabled=false;ng-
keydown=login.focus=true&&$event.keyCode===13&&authUser( );ng-
keyup=fix(login.form.pw,$event);ng-
model=login.pw;placeholder=password;spellcheck=false;type=password;validator=valid
ator.pw>
```

The script 140 may dispatch the gathered data to the control server 150. The control server 150 may process the gathered data of the <script> elements in the context of the corresponding model (unitary for all script elements—the statistical model of the script type elements 220), as follows:
  for each script, a numerical vector may be obtained (for example, the vector may be two-dimensional), where the vector may be computed from the codes of the string characters (any suitable coding method may be used to obtain the character codes, such as ASCII), making up the gathered data (for inline scripts, this data may include the content of the normalized script, for others it is the content of the src attribute). The following vectors may be obtained for the <script> elements contained in the resulting web page 100:
  16314,10816
  2254,2598
  16084,15036
  356,822
  20010,51838
  each vector may be saved in the two-dimensional space of the model 230, in the given case there are no anomalies, all vectors end up in the previously formed clusters (i.e., all vectors are compatible with the data arriving from the script 140 from those versions of the web pages previously). As an illustration, FIG. 4a presents a visualization of the model, where the dots indicate the <script> elements being analyzed, and the colored regions are the previously created clusters 210 of the model 220, as parts of the model 230:

The control server 150 may process the gathered data of the <input> elements in analogous manner, as a result the visualization has the form shown in FIG. 4b. Since no anomalous elements have been detected, the processing may end.

In one example, a malicious inject may have appeared at one of the users on the same page https://my.Kaspersky-Bank.ru/ in the form of an additional <script> element:

```
<script src="https://static.kasperskyBank.ru/ib/prod/bank/malware.js" crossorigin="anonymous"></script>
```

The vector, computed by the method described above, may be equal to (4560,3192) and the model may take on the form shown in FIG. 4c (the current vector reflecting the content of the inject, being an anomaly, is marked in red). The detected anomalous element may be processed by the antivirus means of the control server 150, and the connection itself may be disabled, at the same time the element in the space of the model may be observed to determine its statistical significance.

Web server, web client, database, control server with analysis module and processing module implemented thereon disclosed in the present invention include real devices, systems, components, groups of components, realized with the use of hardware such as integrated microcircuits (application-specific integrated circuit, ASIC) or field-programmable gate arrays (FPGA) or, for example, in the form of a combination of software and hardware, such as a microprocessor system and a set of program instructions, and also on neurosynaptic chips. The functionality of the indicated elements of the system can be realized exclusively by hardware, and also in the form of a combination, where part of the functionality of the elements of the system is realized by software, and part by hardware. In certain variant embodiments, some of the elements, or all of the elements, can be implemented on the processor of a general-purpose computer (such as that shown in FIG. 5).

Figure 5:
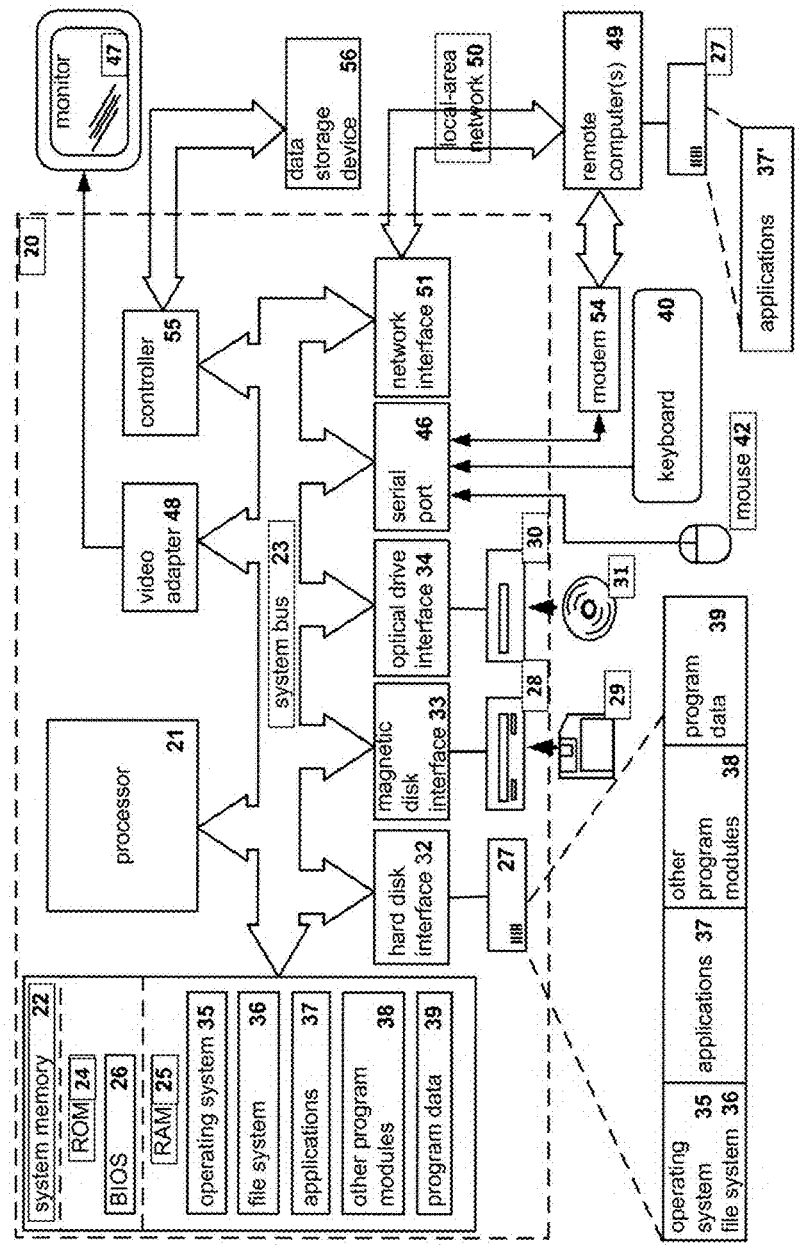
FIG. 5 shows an example of a general-purpose computer system on which the aspects of the systems and methods of detecting anomalous elements of web pages can be implemented.

FIG. 5 is a diagram illustrating an example computer system on which aspects of systems and methods for detecting anomalous elements of web pages may be implemented in accordance with an exemplary aspect of the invention. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIGS. 1-4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting anomalous elements of a web page, the method comprising:
obtaining access to a web site, by a client computing device, by requesting a web page associated with the web site via a web server;
executing the web page by the client computing device to gather data relating to the web page;
determining at least one N-dimensional vector based at least on the gathered data;
creating at least one cluster comprising a set of values of coordinates of vectors for at least one element of the web page in N-dimensional space based on the at least one N-dimensional vector;
creating a statistical model of the web page based on the at least one cluster;
using the statistical model for detecting anomalous elements of the web page; and
determining and identifying the at least one element of the web page as being anomalous, wherein the web server is configured to:
disable a connection with the client computing device in response to detecting that the at least one element of the web page is anomalous;
perform an antivirus scan of the at least one element of the web page to at least determine a statistical significance of the at least one element in connection with a threshold value; and
in response to detecting that the statistical significance of the at least one element is greater than the threshold value, identify the at least one element as being safe and re-establish the connection with the client computing device.

2. The computer-implemented method of claim 1, further comprising:
storing the at least one N-dimensional vector; and
obtaining and executing the web page, by another client computing device, to gather additional data relating to the web page in connection with the at least one N-dimensional vector prior to creating the at least one cluster.

3. The computer-implemented method of claim 1, wherein the web server is further configured to add at least one script to the web page in response to receiving a request from the client computing device requesting the web page.

4. The computer-implemented method of claim 3, wherein executing the web page by the client computing device comprises executing the at least one script to gather the data relating to the at least one element of the web page.

5. The computer-implemented method of claim 1, further comprising:

comparing the at least one N-dimensional vector with clusters and a N-dimensional vector of at least one previously constructed statistical model of the web page; and wherein the determining and identifying of the at least one element of the web page as being anomalous comprises detecting at least one of:

a distance between the at least one N-dimensional vector of the at least one element of the web page and centers of clusters of statistical models of the web page, in the N-dimensional space, is greater than a radii of the clusters; or a measure of proximity between the at least one N-dimensional vector of the at least one element of the web page and the centers of clusters of the statistical models of the web page, in the N-dimensional space, is greater than a first selected threshold value; or a measure of proximity between the at least one N-dimensional vector of the at least one element and N-dimensional vectors of the clusters of the statistical models of the web page which are most distant from the centers of the clusters, in the N-dimensional space, is greater than a second selected threshold value.

6. The computer-implemented method of claim 5, further comprising adding the at least one N-dimensional vector of the at least one element of the web page to the statistical model of the web page upon detecting that the at least one element is not anomalous.

7. The computer-implemented method of claim 1, further comprising:

in response to detecting that the at least one N-dimensional vector of the at least one element of the web page does not correspond to the statistical models of the web page, determining a ratio of the number of web pages relating to the at least one element to a total number of web pages used in the statistical model of the web page.

8. The computer-implemented method of claim 7, wherein the number of web pages relating to the at least one element comprises the number of web pages containing the at least one element or nearby elements whose distances between their N-dimensional vectors in the N-dimensional space is less than a selected threshold value.

9. A system for detecting anomalous elements of a web page, comprising:

at least one processor of a client computing device configured to:

obtain access to a web site by requesting a web page associated with the web site via a web server;

execute the web page to gather data relating to the web page;

determine at least one N-dimensional vector based at least on the gathered data;

create at least one cluster comprising a set of values of coordinates of vectors for at least one element of the web page in N-dimensional space based on the at least one N-dimensional vector;

create a statistical model of the web page based on the at least one cluster;

use the statistical model for detecting anomalous elements of the web page; and determine and identify the at least one element of the web page as being anomalous, wherein the web server is configured to:

disable a connection with the client computing device in response to detecting that the at least one element of the web page is anomalous;

perform an antivirus scan of the at least one element of the web page to at least determine a statistical significance of the at least one element in connection with a threshold value; and in response to detecting that the statistical significance of the at least one element is greater than the threshold value, identify the at least one element as being safe and re-establish the connection with the client computing device.

10. The system of claim 9, wherein the at least one processor is further configured to:

store the at least one N-dimensional vector; and obtain and execute the web page to gather additional data relating to the web page in connection with the at least one N-dimensional vector prior to creating the at least one cluster.

11. The system of claim 9, wherein the web server is further configured to add at least one script to the web page in response to receiving a request from the client computing device requesting the web page.

12. The system of claim 11, wherein, to execute the web page by the client computing device, the at least one processor is further configured to execute the at least one script to gather the data relating to the at least one element of the web page.

13. The system of claim 9, wherein the at least one processor is further configured to:

compare the at least one N-dimensional vector with clusters and a N-dimensional vector of at least one previously constructed statistical model of the web page; and wherein the determine and identify the at least one element of the web page as being anomalous comprises detecting at least one of:

a distance between the at least one N-dimensional vector of the at least one element of the web page and centers of clusters of statistical models of the web page, in the N-dimensional space, is greater than a radii of the clusters; or a measure of proximity between the at least one N-dimensional vector of the at least one element of the web page and the centers of clusters of the statistical models of the web page, in the N-dimensional space, is greater than a first selected threshold value; or a measure of proximity between the at least one N-dimensional vector of the at least one element and N-dimensional vectors of the clusters of the statistical models of the web page which are most distant from the centers of the clusters, in the N-dimensional space, is greater than a second selected threshold value.

14. The system of claim 13, wherein the at least one processor is further configured to add the at least one N-dimensional vector of the at least one element of the web page to the statistical model of the web page upon detecting that the at least one element is not anomalous.

15. The system of claim 9, wherein the at least one processor is further configured to determine a ratio of the number of web pages relating to the at least one element to a total number of web pages used in the statistical model of the web page in response to detecting that the at least one N-dimensional vector of the at least one element of the web page does not correspond to the statistical models of the web page, wherein the number of web pages relating to the at least one element comprises the number of web pages containing the at least one element or nearby elements whose distances between their N-dimensional vectors in the N-dimensional space is less than a selected threshold value.

16. A non-transitory computer readable medium storing thereon computer executable instructions for detecting anomalous elements of a web page, including instructions for:
- obtaining access to a web site, by a client computing device, by requesting a web page associated with the web site via a web server;
- executing the web page by the client computing device to gather data relating to the web page;
- determining at least one N-dimensional vector based at least on the gathered data;
- creating at least one cluster comprising a set of values of coordinates of vectors for at least one element of the web page in N-dimensional space based on the at least one N-dimensional vector;
- creating a statistical model of the web page based on the at least one cluster;
- using the statistical model for detecting anomalous elements of the web page; and
- determining and identifying the at least one element of the web page as being anomalous, wherein the web server is configured to:
  - disable a connection with the client computing device in response to detecting that the at least one element of the web page is anomalous;
  - perform an antivirus scan of the at least one element of the web page to at least determine a statistical significance of the at least one element in connection with a threshold value; and
  - in response to detecting that the statistical significance of the at least one element is greater than the threshold value, identify the at least one element as being safe and re-establish the connection with the client computing device.

17. The computer readable medium of claim 16, further comprising instructions for:
- comparing the at least one N-dimensional vector with clusters and a N-dimensional vector of at least one previously constructed statistical model of the web page; and
- wherein the determining and identifying the at least one element of the web page as being anomalous comprises detecting at least one of:
  - a distance between the at least one N-dimensional vector of the at least one element of the web page and centers of clusters of statistical models of the web page, in the N-dimensional space, is greater than a radii of the clusters; or
  - a measure of proximity between the at least one N-dimensional vector of the at least one element of the web page and the centers of clusters of the statistical models of the web page, in the N-dimensional space, is greater than a first selected threshold value; or
  - a measure of proximity between the at least one N-dimensional vector of the at least one element and N-dimensional vectors of the clusters of the statistical models of the web page which are most distant from the centers of the clusters, in the N-dimensional space, is greater than a second selected threshold value.

18. The computer readable medium of claim 16, further comprising instructions for determining a ratio of the number of web pages relating to the at least one element to a total number of web pages used in the statistical model of the web page, in response to detecting that the at least one N-dimensional vector of the at least one element of the web page does not correspond to the statistical models of the web page.

19. The computer readable medium of claim 16, wherein the web server is further configured to add at least one script to the web page in response to receiving a request from the client computing device requesting the web page.

20. The computer readable medium of claim 19, wherein executing the web page by the client computing device comprises executing the at least one script to gather the data relating to the at least one element of the web page.

\* \* \* \* \*